(12) United States Patent
Long et al.

(10) Patent No.: US 11,646,469 B2
(45) Date of Patent: May 9, 2023

(54) BATTERY PACK CASE AND BATTERY PACK

(71) Applicant: Contemporary Amperex Technology Co., Limited, Ningde (CN)

(72) Inventors: Chao Long, Ningde (CN); Linggang Zhou, Ningde (CN); Derong Wang, Ningde (CN); Libing Chan, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 125 days.

(21) Appl. No.: 16/967,350

(22) PCT Filed: Dec. 28, 2018

(86) PCT No.: PCT/CN2018/124619
§ 371 (c)(1),
(2) Date: Aug. 4, 2020

(87) PCT Pub. No.: WO2019/184496
PCT Pub. Date: Oct. 3, 2019

(65) Prior Publication Data
US 2021/0036274 A1 Feb. 4, 2021

(30) Foreign Application Priority Data
Mar. 30, 2018 (CN) .......................... 201820462903.5

(51) Int. Cl.
*H01M 50/262* (2021.01)
*H01M 50/204* (2021.01)
*H01M 50/271* (2021.01)

(52) U.S. Cl.
CPC ....... *H01M 50/262* (2021.01); *H01M 50/204* (2021.01); *H01M 50/271* (2021.01)

(58) Field of Classification Search
CPC .. H01M 50/20; H01M 50/262; H01M 50/204; H01M 50/271; H01M 10/42; H01M 10/425; Y02E 60/10
See application file for complete search history.

(56) References Cited

U.S. PATENT DOCUMENTS

| | | | |
|---|---|---|---|
| 2008/0123262 A1 | 5/2008 | Coleman et al. | |
| 2015/0079458 A1* | 3/2015 | Maguire | H01M 50/342 429/163 |
| 2017/0225715 A1* | 8/2017 | Kobayashi | B60N 2/015 |

FOREIGN PATENT DOCUMENTS

| | | |
|---|---|---|
| CN | 202797123 U | 3/2013 |
| CN | 205692891 | 11/2016 |

(Continued)

OTHER PUBLICATIONS

English Translation of CN206332101.*
(Continued)

*Primary Examiner* — Kiran Quraishi Akhtar
(74) *Attorney, Agent, or Firm* — East IP P.C.

(57) ABSTRACT

The present application relates to a battery pack case and a battery pack, the battery pack case includes: a case body including an accommodating chamber and a side wall provided with a maintenance port communicating with the accommodating chamber; a cover plate assembly, detachably connected to an outer surface of the side wall, being capable of opening or closing the maintenance port and including a cover plate and an outer gasket stacked with each other. The cover plate includes a first concave portion recessed in a thickness direction of the cover plate and a first limiting portion surrounding an outer periphery of the first concave portion, and abuts against the outer surface by the first limiting portion to form a first receiving chamber, the
(Continued)

outer gasket is disposed in the first receiving chamber and is closely contact with the first concave portion and the outer surface.

11 Claims, 7 Drawing Sheets

(56) References Cited

FOREIGN PATENT DOCUMENTS

| | | | | |
|---|---|---|---|---|
| CN | 206332101 | | 7/2017 | |
| CN | 206598716 | | 10/2017 | |
| CN | 207116497 | | 3/2018 | |
| CN | 208014777 | | 10/2018 | |
| JP | 206332101 | * | 7/2017 | ............ Y02E 60/10 |
| WO | 2018032408 A1 | | 2/2018 | |
| WO | WO2018032408 | * | 2/2018 | ............ H01M 2/02 |

OTHER PUBLICATIONS

English Translation of WO2018032408.*
The extended European search report for EP Application No. 18912651.9, dated Feb. 10, 2021, 7 pages.
PCT International Search Report for PCT/CN2018/124619, dated Apr. 1, 2019, 12 pages.

* cited by examiner

BATTERY PACK CASE AND BATTERY PACK

CROSS REFERENCE TO RELATED APPLICATIONS

The present application is a National Phase of PCT Application No. PCT/CN2018/124619, filed on Dec. 28, 2018, which claims the priority of the Chinese patent application 201820462903.5, titled by "BATTERY PACK CASE AND BATTERY PACK" and filed on Mar. 30, 2018, both of which are entirely incorporated herein by reference.

TECHNICAL FIELD

The present application relates to a technical filed of batteries, and particularly relates to a battery pack case and a battery pack.

BACKGROUND

With the development of technology, an application range of power batteries in production and life is becoming wider and wider. When the power batteries are used in groups, it is necessary to connect multiple power batteries in series or parallel by use of a busbar to form a battery module, and multiple battery modules are enclosed by a battery pack case to constitute a battery pack.

Components inside the battery pack usually need to be maintained after the battery pack has been running for a period of time, for example, a fuse, a fan and other wearing parts in the battery pack often need to be replaced, or, when attenuations of the power batteries in the battery pack are inconsistent, quick recharge and maintenance are required.

However, due to an unreasonable structural design of the battery pack case of the conventional battery pack, the above maintenance operation can only be done after a lower case and an upper cover of the battery pack case are completely disassembled. Disassembling the lower case and the upper cover of the battery pack case is not only time-consuming and laborious, but also resulting in that it is difficult to ensure a sealing between large sealing surfaces of the lower case and the upper cover when the lower case and the upper cover are assembled again, which will impact a safety of the overall battery pack.

Therefore, there is an urgent need for a new battery pack case and battery pack.

SUMMARY

The embodiments of the present application provide a battery pack case and a battery pack, the battery pack case is provided with a maintenance port and a cover plate assembly, maintenance of components inside the battery pack case may be done without disassembling the battery pack case, which saves time and effort and may ensure safety of the battery pack.

In one aspect, according to an embodiment of the present application, a battery pack case is proposed, which includes: a case body, including an accommodating chamber, a side wall of the case body being provided with a maintenance port communicating with the accommodating chamber; a cover plate assembly, detachably connected to an outer surface of the side wall and being capable of opening or closing the maintenance port, the cover plate assembly including a cover plate and an outer gasket stacked with each other; wherein the cover plate includes a first concave portion formed by being recessed in a thickness direction of the cover plate and a first limiting portion formed by surrounding an outer periphery of the first concave portion, the cover plate abuts against the outer surface by the first limiting portion to form a first receiving chamber disposed surrounding the maintenance port between the first concave portion and the outer surface, and the outer gasket is disposed in the first receiving chamber and is closely contact with the first concave portion and the outer surface.

In another aspect, according to an embodiment of the present application, a battery pack is proposed, which includes the above-mentioned battery pack case; a unit cell group disposed in the accommodating chamber and including a plurality of stacked unit cells; and an integrated control circuit system disposed in the accommodating chamber and electrically connected to each unit cell; wherein the integrated control circuit system is disposed facing the maintenance port.

According to the battery pack case and the battery pack provided in the embodiments of the present application, the battery pack case includes a case body and a cover plate assembly, the case body includes an accommodating chamber, a side wall of the case body is provided with a maintenance port communicating with the accommodating chamber, and the cover plate assembly is detachably connected to the outer surface of the side wall to open or close the maintenance port. The accommodating chamber is used to install corresponding components of the battery pack, when the components need maintenance, the maintenance may be done by simply opening the cover plate assembly, which saves time and effort. Since the cover plate assembly includes a cover plate and an outer gasket stacked with each other, and meanwhile, the cover plate includes a first concave portion formed by being recessed in a thickness direction of the cover plate and a first limiting portion formed by surrounding an outer periphery of the first concave portion, the cover plate abuts against the outer surface of the side wall by the first limiting portion, to form a first receiving chamber for receiving the outer gasket, the cover plate adopts the above structure and the cooperation manner with the outer gasket, may effectively control a compressed amount of the outer gasket, ensuring a sealing between the cover plate assembly and the side wall, thereby ensuring safety of the battery pack.

BRIEF DESCRIPTION OF THE DRAWINGS

Features, advantages and technical effects of exemplary embodiments of the present application will be described below with reference to the drawings.

Wherein:
1—battery pack case;
10—case body; 11—lower case; 12—upper cover; 13—accommodating chamber; 14—maintenance port; 15—side wall; 151—outer surface; 152—inner surface;
20—cover plate assembly; 21—cover plate; 211—first concave portion; 212—first limiting portion; 213—first receiving chamber; 214—reinforcement portion; 215—connecting hole; 22—outer gasket;
31—connecting portion; 311—connecting rod; 312—locking cap; 313—step surface; 32—fixing plate; 321—second concave portion; 322—second limiting portion; 323—second receiving chamber; 324—riveting hole; 325—through opening; 33—inner gasket; 34—rivet;
2—integrated control circuit system; 201—recharge socket;
3—unit cell group.

DETAILED DESCRIPTION

Features and exemplary embodiments of various aspects of the present application will be described in detail below. In the following detailed description, numerous specific details are set forth to provide a full understanding of the present application. However, it shall be apparent to the person skilled in the art that the present application may be implemented without some of the details. The following description of the embodiments is made merely to provide a better understanding of the present application by showing examples of the present application. In the figures and the following description, at least some of well-known structures and techniques are not shown to avoid unnecessarily obscuring the present application. Further, for clarity, size of part of the structure may be exaggerated. Furthermore, features, structures, or characteristics described hereinafter may be combined in any suitable manner into one or more embodiments.

All of orientations in the following description refer to directions as shown in the figures, and are not intended to define specific structure of a battery pack case and a battery pack of the present application. In the description of the present application, it shall be further noted that, unless otherwise clearly stated and defined, the terms such as "installation", "connection" shall be understood broadly, and may be, for example, a fixed connection, a disassemble connection, or an integral connection, and may be a direct connection or an indirect connection. For the person skilled in the art, the specific meaning of the above terms in the present application can be understood according to specific circumstance.

When the battery pack case provided by embodiments of the present application is applied to a battery pack, the maintenance of components inside the battery pack may be performed without removing a lower case and an upper cover, which saves time and effort, and may ensure a safety performance of the overall battery pack.

In order to better understand the present application, the battery pack case and the battery pack according to embodiments of the present application will be described in detail below with reference to FIGS. 1 to 11.

Figure 1:
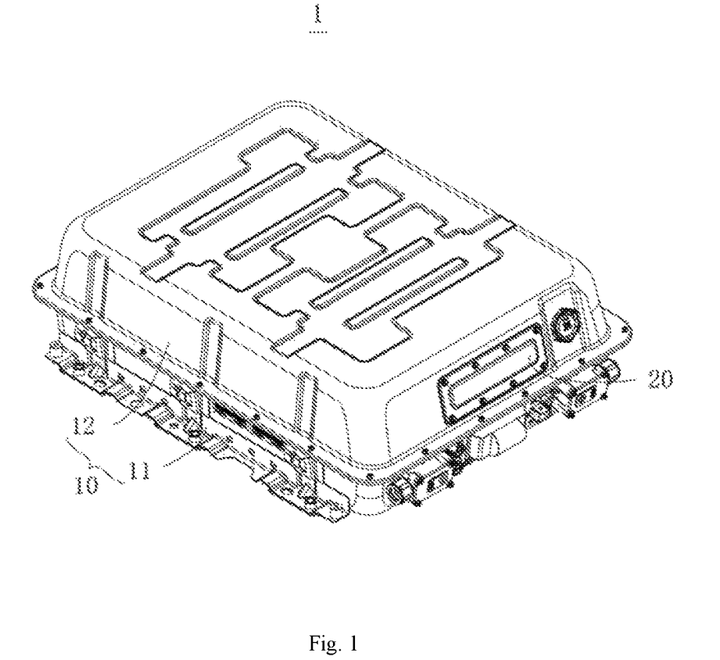
FIG. 1 is a structural schematic diagram of a battery pack case of an embodiment of the present application.
Figure 2:
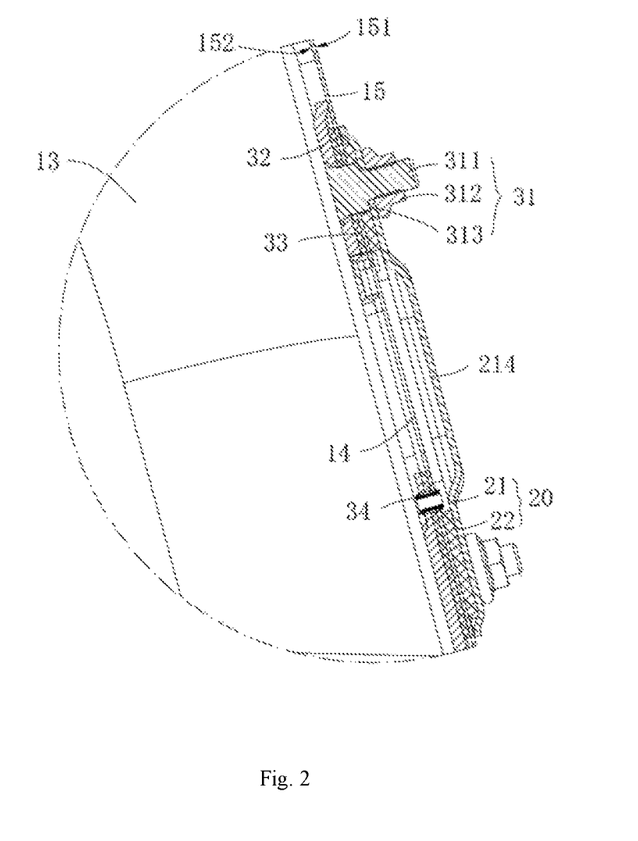
FIG. 2 is a partial cross-sectional view of a battery pack case of an embodiment of the present application.

Referring to FIGS. 1 and 2, FIG. 1 shows a structural schematic diagram of a battery pack case 1 according to an embodiment of the present application, FIG. 2 shows a partial cross-sectional view of the battery pack case 1 of an embodiment of the present application.

According to an embodiment of the present application, a battery pack case 1 is proposed, which includes a case body 10 and a cover plate assembly 20; the case body 10 includes an accommodating chamber 13; a side wall 15 of the case body 10 is provided with a maintenance port 14 communicating with the accommodating chamber 13; the cover plate assembly 20 is detachably connected to an outer surface 151 of the side wall 15, and is capable of opening or closing the maintenance port 14.

Specifically, the case body 10 includes a lower case 11 and an upper cover 12 connected to each other; the lower case 11 and the upper cover 12 may be bonded to each other at abutting openings by a structural adhesive and locked by locking bolts. The accommodating chamber 13 is formed by enclosure of the lower case 11 and the upper cover 12 together; side walls of the lower case 11 and the upper cover 12 constitute the side wall 15 of the case body 10; the maintenance port 14 is preferably located on the upper cover 12 to facilitate the maintenance of the components. In the present embodiment, the maintenance port 14 is in a rectangular shape and the number is one. Apparently, this is one of the implementations, and in some optional embodiments, the maintenance port 14 may also be in other shapes, such as round, oval, polygonal or irregular shapes; meanwhile, the number of maintenance ports 14 is not limited to one, may be set according to the number of components requiring maintenance and positions of the components inside the battery pack case 1, and may be more than two.

Figure 3:
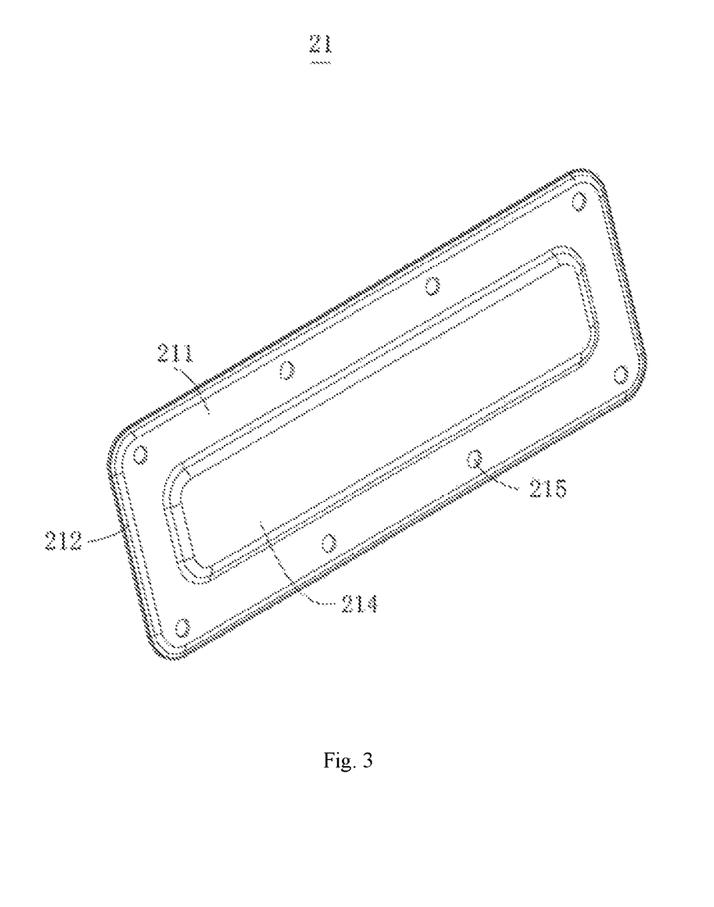
FIG. 3 is an axonometric view of a cover plate of an embodiment of the present application.
Figure 4:
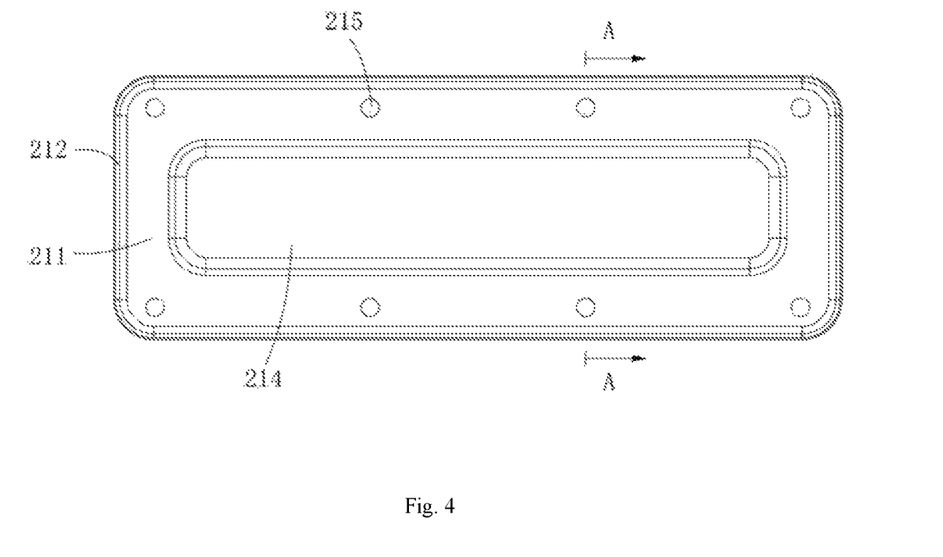
FIG. 4 is a front view of the structure shown in FIG. 3.
Figure 5:
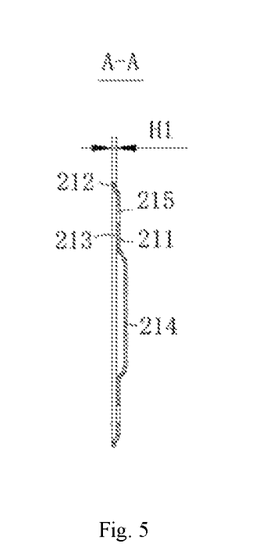
FIG. 5 is a cross-sectional view taken along A-A direction in FIG. 4.

Referring to FIGS. 3 to 5 together, FIG. 3 shows an axonometric view of the cover plate 21 of an embodiment of the present application, FIG. 4 shows a front view of the structure shown in FIG. 3, FIG. 5 shows a cross-sectional view taken along A-A direction in FIG. 4. The cover plate assembly 20 includes a cover plate 21 and an outer gasket 22 stacked with each other; the cover plate 21 includes a first concave portion 211 formed by being recessed in a thickness direction of the cover plate 21 and a first limiting portion 212 formed by surrounding an outer periphery of the first concave portion 211; the cover plate 21 abuts against the outer surface 151 of the side wall 15 by the first limiting portion 212 to form a first receiving chamber 213 disposed surrounding the maintenance port 14 between the first concave portion 211 and the outer surface 151; the outer gasket 22 is disposed in the first receiving chamber 213 and is closely contact with the first concave portion 211 and the outer surface 151. When the cover plate assembly 20 provided in the embodiment of the present application is connected to the case body 10, it may be directly connected by fasteners, and correspondingly, it is only necessary to provide connecting holes 215 on the cover plate 21 and the outer gasket 22 of the cover plate assembly 20.

Therefore, in the battery pack case 1 provided in the embodiment of the present application, the accommodating chamber 13 is used to install corresponding components of the battery pack; when the components need maintenance, it merely needs to unscrew the fasteners to separate the cover plate assembly 20 from the case body 10 and open the maintenance port 14; the maintenance of the components in the accommodating chamber 13 may be done through the maintenance port 14, without the need of disassembling the lower case 11 and the upper cover 12, which saves time and effort.

After the maintenance of the components is completed, the cover plate assembly 20 is reconnected to the case body 10 by the fasteners; the outer gasket 22 extends beyond the first concave portion 211 and the first limiting portion 212 of the cover plate 21 in a free state, that is, in an uncompressed state; by screwing the fasteners, the entire cover plate assembly 20 is moved toward the maintenance port 14 of the case body 10, and the gasket of the cover plate assembly 20 contacts the side wall 15 of the case body 10 first. The fasteners are screwed continuously, and until the first limiting portion 212 and the side wall 15 of the case body 10 contact and abut each other, the screwing motion is stopped; at this time, the outer gasket 22 is received in the first receiving chamber 213 and is closely contact with the first concave portion 211 and the outer surface 151.

The cover plate 21, adopting the above structure and the cooperation manner with the outer gasket 22, may effectively control a compressed amount of the outer gasket 22, to avoid an occurrence of sealing failure of the outer gasket 22 due to excessive compression, further ensuring a sealing between the cover plate assembly 20 and the side wall 15, and ensuring the safety of the battery pack.

In a specific implementation, a distance H1 from a concave surface of the first concave portion 211 to a surface of the first limiting portion 212 facing the side wall 15 of the case body 10 may be set according to a material and a compressible amount of the outer gasket 22, as long as it can limit the outer gasket 22 so that a compression limit of the outer gasket 22 will not be exceeded when the outer gasket 22 is compressed and the sealing performance of the outer gasket 22 can be ensured.

As an optional implementation, the cover plate 21 further includes a reinforcement portion 214, the reinforcement portion 214 is located in a central area of the cover plate 21 and is formed by further recessing the first concave portion 211 in a direction away from the outer gasket 22. Since the cover plate assembly 20 is used to seal the maintenance port 14 and ensure the sealing performance of the overall battery pack case 1, it is necessary to avoid deformation of the cover plate assembly 20 as much as possible. By providing the reinforcement portion 214 on the cover plate 21, a strength of the cover plate 21 may be effectively increased, to avoid deformation of the cover plate 21, thereby ensuring the sealing performance to the maintenance port 14.

Since the side wall 15 of the case body 10 in the prior art is generally thin, a process of making a threaded hole that can be connected to the fastener such as a fastening screw, in the side wall 15, is relatively difficult. Therefore, as an optional implementation, the battery pack case 1 further includes a fixing assembly connected to an inner surface 152 of the side wall 15. The fixing assembly includes a connecting portion 31 that penetrates through the side wall 15 and the cover plate assembly 20 in the thickness direction of the cover plate 21, and the cover plate assembly 20 is detachably connected to the outer surface 151 of the side wall 15 by the connecting portion 31. By providing the fixing assembly including the connecting portion 31, in the case that the battery pack case 1 is connected with the cover plate assembly 20 to seal the maintenance port 14, it is sufficient to merely make a corresponding through hole for the connecting portion 31 to pass through on an outer periphery of the maintenance port 14, without the need of an operation such as tapping; thus, the battery pack case 1 to be provided with the maintenance port 14, is not limited by the thickness of the side wall 15, all may be provided with the maintenance port 14, and the sealing to the maintenance port 14 may be ensured.

Figure 6:
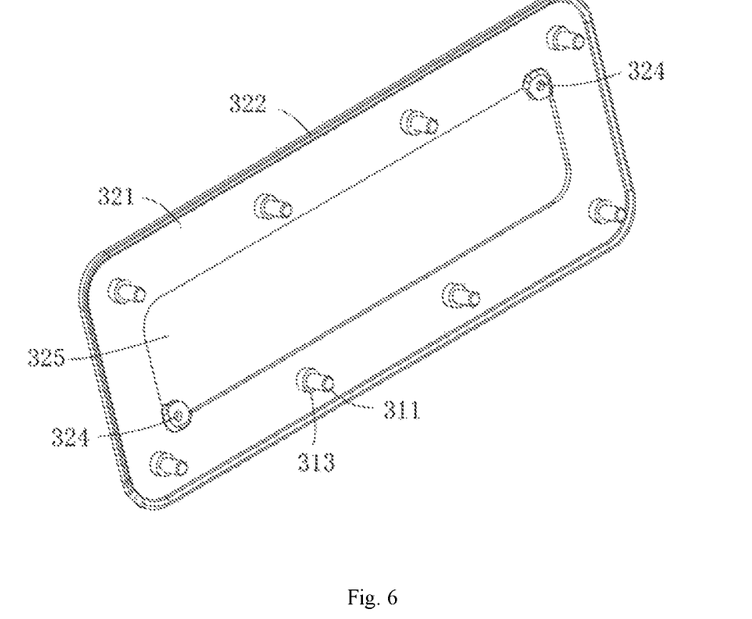
FIG. 6 is a partial structural schematic diagram of a fixing assembly of an embodiment of the present application.
Figure 7:
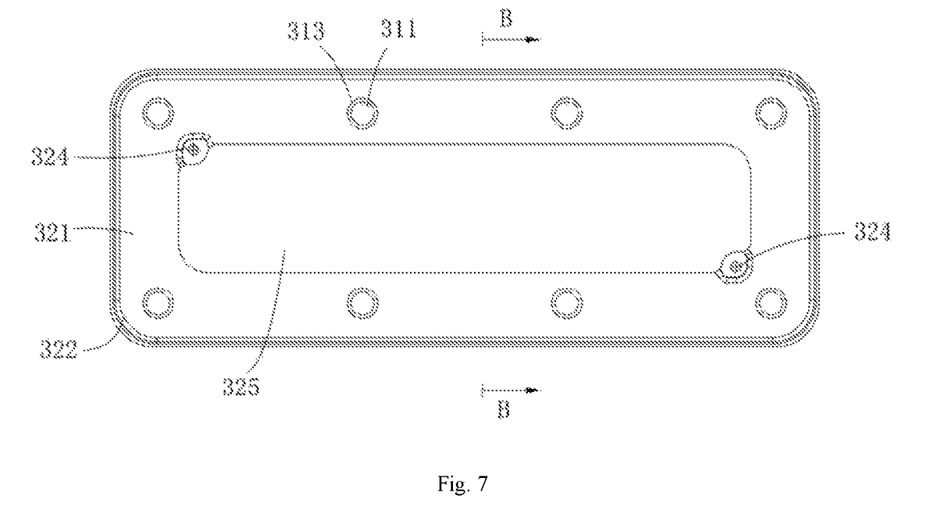
FIG. 7 is a front view of the structure shown in FIG. 6.
Figure 8:
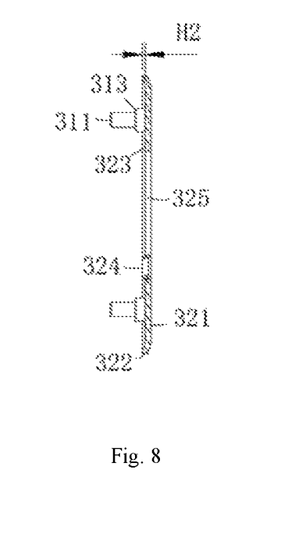
FIG. 8 is a cross-sectional view taken along B-B direction in FIG. 7.

Referring to FIG. 6 to FIG. 8 together, FIG. 6 shows a partial structural schematic diagram of the fixing assembly of an embodiment of the present application, FIG. 7 shows a front view of the structure illustrated in FIG. 6, FIG. 8 shows a cross-sectional view taken along B-B direction in FIG. 7. In order to facilitate connection with the inner surface 152 of the side wall 15 of the case body 10, the fixing assembly further includes a fixing plate 32 disposed opposite to the cover plate assembly 20, the fixing assembly is connected to the inner surface 152 via the fixing plate 32, the connecting portion 31 is connected to the fixing plate 32, and the fixing plate 32 is provided with a through opening 325 corresponding to the maintenance port 14; in a specific implementation, a riveting hole 324 may be provided in the fixing plate 32, so that the fixing plate 32 is connected to the case body 10 by a connecting piece such as a rivet 34, which facilitates processing and installation, and saves cost of the battery pack case 1.

In the present embodiment, the connecting portion 31 preferably includes a connecting rod 311 and a locking cap 312 connected to each other, one end of the connecting rod 311 is connected to the fixing plate 32, and the other end passes through the side wall 15, the outer gasket 22 and the cover plate 21 in the thickness direction of the cover plate 21 and is detachably connected to the locking cap 312; in a specific implementation, the connecting rod 311 may be a bolt structure, the locking cap 312 may be a nut that can be screwed to the bolt structure. By adopting the above-mentioned structure, the connecting portion 31 facilitates disassembly and assembly of the cove plate assembly 20, on the basis of ensuring the sealing requirements for the battery pack case 1.

As an optional implementation, a surface of the connecting rod 311 mating with the cover plate 21 is a stepped surface 313, that is, the connecting rod 311 is formed in a stepped shape as a whole. By setting the surface of the connecting rod 311 mating with the cover plate 21 as the stepped surface 313, in the case that the connecting rod 311 and the locking cap 312 are connected to each other to connect the cover plate assembly 20 with the side wall 15 of the case body 10, the stepped surface 313 can provide a support surface corresponding to the locking cap 312 for the cover plate 21. Local deformation of the cover plate 21 may be avoided when the locking cap 312 locks the cover plate assembly 20 relative to the side wall 15 of the case body 10, thereby further ensuring the sealing performance between the cover plate assembly 20 and the side wall 15 of the case body 10.

Since the side wall 15 of the case body 10 is provided with the through hole for the connecting portion 31 to pass through, in order to further ensure the sealing performance of the battery pack case 1, as an optional implementation, the fixing assembly further includes an inner gasket 33 stacked with the fixing plate 32 in the thickness direction of the cover plate 21, the inner gasket 33 is located between the fixing plate 32 and the inner surface 152, and the sealing performance of the battery pack case 1 is further increased by the inner gasket 33.

Similarly, as an optional implementation, the fixing plate 32 includes a second concave portion 321 formed by being recessed in the thickness direction and a second limiting portion 322 formed by surrounding an outer periphery of the second concave portion 321, the fixing plate 32 abuts against the inner surface 152 by the second limiting portion 322 to form a second receiving chamber 323 disposed surrounding the maintenance port 14 between the second concave portion 321 and the inner surface 152, and the inner gasket 33 is disposed in the second receiving chamber 323 and is closely contact with the second concave portion 321 and the inner surface 152.

Taking the same principles of the structures and cooperation between the outer gasket 22 and the cover plate 21, the fixing plate 32, adopting the above structure and the cooperation manner with the inner gasket 33, may effectively control a compressed amount of the inner gasket 33, to avoid an occurrence of sealing failure of the inner gasket 33 due to excessive compression, further ensuring a sealing between the inner gasket 33 and the side wall 15 and the fixing plate 32, and ensuring the safety of the battery pack.

In a specific implementation, a distance H2 from a concave surface of the second concave portion 321 to a surface of the second limiting portion 322 facing the side wall 15 of the case body 10 may be set according to a material and a compressible amount of the inner gasket 33, as long as it can limit the inner gasket 33 so that a compression limit of the inner gasket 33 will not be exceeded when the inner gasket 33 is compressed and the sealing performance of the inner gasket 33 can be ensured.

Figure 9:
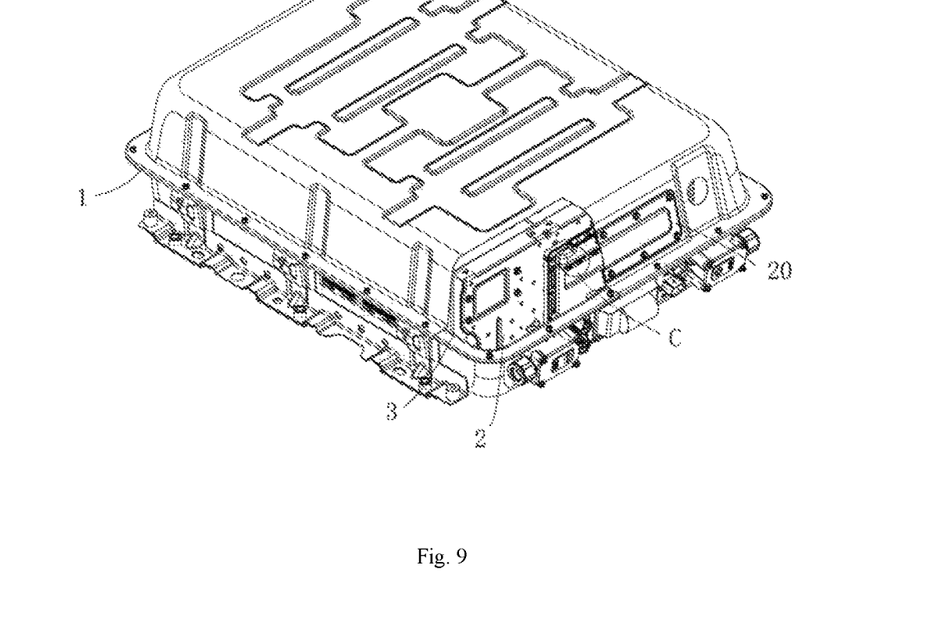
FIG. 9 is a structural schematic diagram of a battery pack of an embodiment of the present application.
Figure 10:
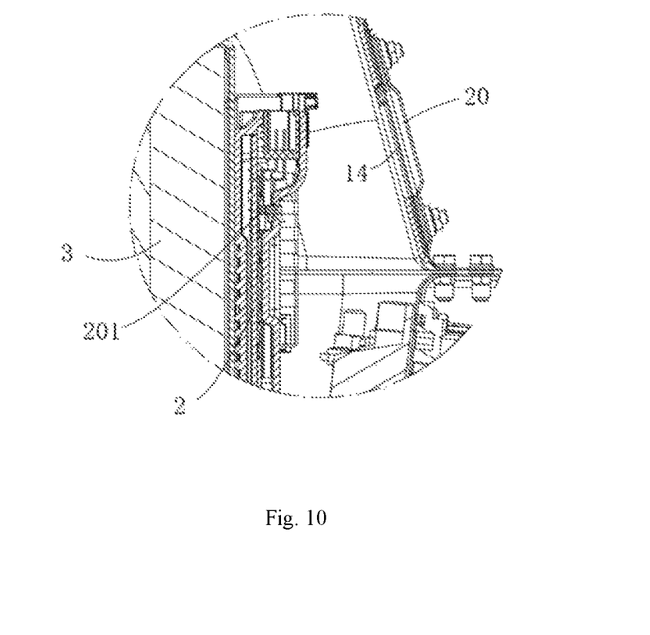
FIG. 10 is a partial cross-sectional view of a battery pack of an embodiment of the present application.
Figure 11:
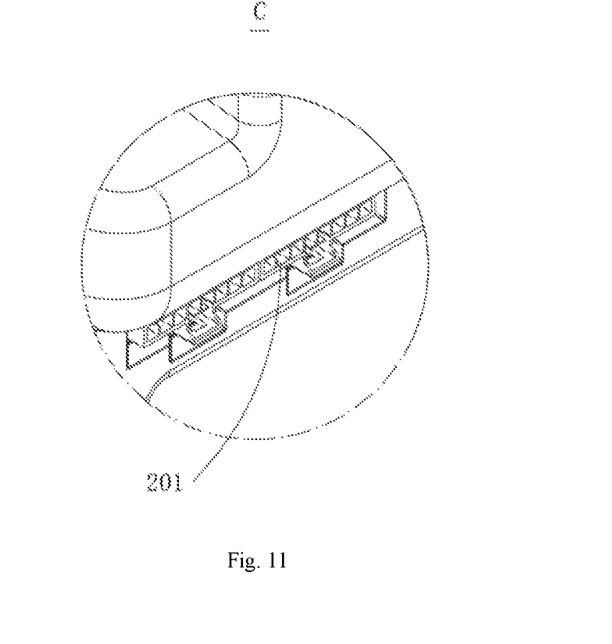
FIG. 11 is an enlarged view of position C in FIG. 9.

Referring to FIGS. 9 to 11 together, FIG. 9 is a structural schematic diagram of a battery pack of an embodiment of the present application, FIG. 10 is a partial cross-sectional view of the battery pack according to an embodiment of the present application, and FIG. 11 is an enlarged view of position C in FIG. 9. An embodiment of the present application further provides a battery pack, including the above-mentioned battery pack case 1, a unit cell group 3, and an integrated control circuit system 2. The unit cell group 3 is disposed in the accommodating chamber 13 and includes a plurality of stacked unit cells; the integrated control circuit system 2 is disposed in the accommodating chamber 13 and electrically connected to each unit cell; the integrated control circuit system 2 is disposed facing the maintenance port 14.

Since the battery pack provided by the embodiment of the present application includes the battery pack case 1 of the above various embodiments, when internal components of the battery pack need maintenance, the cover plate assembly 20 on the battery pack case 1 may be removed, and the maintenance may be performed through the maintenance port 14. Since the integrated control circuit system 2 is disposed facing the maintenance port 14, when the cover plate assembly 20 is removed, the integrated control circuit system 2 may be exposed; recharge operation for low-capacity unit cell may be performed by inserting a recharge plug of electrical tools into a recharge socket 201 on the integrated control circuit system 2; meanwhile, a fuse, a fan and other wearing parts that often need to be replaced, may be replaced. The operation is simple, it is easy to maintain the components of the battery pack, and the sealing performance is good.

Although the present application has been described with reference to the preferred embodiments, various improvements may be made and components therein may be replaced with equivalents without departing from the scope of the present application. In particular, as long as there is no structural conflict, the various technical features mentioned in the various embodiments may be combined in any way. The present application is not limited to the specific embodiments disclosed herein, but includes all technical solutions falling within the scope of the claims.

What is claimed is:
1. A battery pack case, comprising:
a case body, comprising an accommodating chamber, a side wall of the case body being provided with a maintenance port communicating with the accommodating chamber;
a cover plate assembly, detachably connected to an outer surface of the side wall and being capable of opening or closing the maintenance port, the cover plate assembly comprising a cover plate and an outer gasket stacked with each other;
wherein the cover plate comprises a first concave portion formed by being recessed in a thickness direction of the cover plate and a first limiting portion formed by surrounding an outer periphery of the first concave portion, the cover plate abuts against the outer surface by the first limiting portion to form a first receiving chamber disposed surrounding the maintenance port between the first concave portion and the outer surface, and the outer gasket is disposed in the first receiving chamber and is closely in contact with the first concave portion and the outer surface,
wherein the battery pack case further comprises a fixing assembly connected to an inner surface of the side wall, the fixing assembly comprises a connecting portion penetrating through the side wall and the cover plate assembly in the thickness direction, and the cover plate assembly is detachably connected to the outer surface via the connecting portion,
wherein the fixing assembly further comprises a fixing plate disposed opposite to the cover plate assembly, the fixing assembly is connected to the inner surface of the side wall via the fixing plate, and the connecting portion is connected to the fixing plate, and
wherein the connecting portion comprises a connecting rod and a locking cap connected to each other, the connecting rod extends from an inner surface of the fixing plate and penetrates through the fixing plate, the side wall, the outer gasket and the cover plate in order in the thickness direction and is detachably connected with the locking cap, and the locking cap is disposed on an outer side of the cover plate and is formed as a separate member, and
the connecting rod comprises a stepped surface, and the stepped surface contacts and abuts against an inner surface of the cover plate.

2. The battery pack case according to claim 1, wherein the cover plate further comprises a reinforcement portion, the reinforcement portion is located in a central area of the cover plate and formed by further recessing the first concave portion in a direction away from the outer gasket.

3. The battery pack case according to claim 1, wherein the fixing assembly further comprises an inner gasket stacked with the fixing plate in the thickness direction, and the inner gasket is located between the fixing plate and the inner surface of the side wall.

4. The battery pack case according to claim 3, wherein the fixing plate comprises a second concave portion formed by being recessed in the thickness direction and a second limiting portion formed by surrounding an outer periphery of the second concave portion, the fixing plate abuts against the inner surface of the side wall by the second limiting portion to form a second receiving chamber disposed surrounding the maintenance port between the second concave portion and the inner surface of the side wall, and the inner gasket is disposed in the second receiving chamber and is closely in contact with the second concave portion and the inner surface of the side wall.

5. The battery pack case according to claim 1, wherein the case body comprises a lower case and an upper cover connected to each other, the accommodating chamber is formed by enclosure of the lower case and the upper cover together, and the maintenance port is located on the upper cover.

6. A battery pack, comprising:
a battery pack case, comprising:
   a case body, comprising an accommodating chamber, a side wall of the case body being provided with a maintenance port communicating with the accommodating chamber;
   a cover plate assembly, detachably connected to an outer surface of the side wall and being capable of opening or closing the maintenance port, the cover plate assembly comprising a cover plate and an outer gasket stacked with each other;
   wherein the cover plate comprises a first concave portion formed by being recessed in a thickness direction of the cover plate and a first limiting portion formed by surrounding an outer periphery of the first concave portion, the cover plate abuts against the outer surface by the first limiting portion to form a first receiving chamber disposed surrounding the maintenance port between the first concave portion and the outer surface, and the outer gasket is disposed in the first receiving chamber and is closely in contact with the first concave portion and the outer surface,
   wherein the battery pack case further comprises a fixing assembly connected to an inner surface of the side wall, the fixing assembly comprises a connecting portion penetrating through the side wall and the cover plate assembly in the thickness direction, and the cover plate assembly is detachably connected to the outer surface via the connecting portion,
   wherein the fixing assembly further comprises a fixing plate disposed opposite to the cover plate assembly, the fixing assembly is connected to the inner surface of the side wall via the fixing plate, and the connecting portion is connected to the fixing plate, and
   wherein the connecting portion comprises a connecting rod and a locking cap connected to each other, the connecting rod extends from an inner surface of the fixing plate and penetrates through the fixing plate, the side wall, the outer gasket and the cover plate in order in the thickness direction and is detachably connected with the locking cap, and the locking cap is disposed on an outer side of the cover plate and is formed as a separate member;
   a unit cell group disposed in the accommodating chamber, the unit cell group comprising a plurality of stacked unit cells; and
   an integrated control circuit system, disposed in the accommodating chamber and electrically connected to each unit cell;
   wherein the integrated control circuit system is disposed facing the maintenance port, and
   the connecting rod comprises a stepped surface, and the stepped surface contacts and abuts against an inner surface of the cover plate.

7. The battery pack according to claim 6, wherein the cover plate further comprises a reinforcement portion, the reinforcement portion is located in a central area of the cover plate and formed by further recessing the first concave portion in a direction away from the outer gasket.

8. The battery pack according to claim 6, wherein the fixing assembly further comprises an inner gasket stacked with the fixing plate in the thickness direction, and the inner gasket is located between the fixing plate and the inner surface of the side wall.

9. The battery pack according to claim 8, wherein the fixing plate comprises a second concave portion formed by being recessed in the thickness direction and a second limiting portion formed by surrounding an outer periphery of the second concave portion, the fixing plate abuts against the inner surface of the side wall by the second limiting portion to form a second receiving chamber disposed surrounding the maintenance port between the second concave portion and the inner surface of the side wall, and the inner gasket is disposed in the second receiving chamber and is closely in contact with the second concave portion and the inner surface of the side wall.

10. The battery pack according to claim 6, wherein the case body comprises a lower case and an upper cover connected to each other, the accommodating chamber is formed by enclosure of the lower case and the upper cover together, and the maintenance port is located on the upper cover.

11. The battery pack case according to claim 2, wherein the case body comprises a lower case and an upper cover connected to each other, the accommodating chamber is formed by enclosure of the lower case and the upper cover together, and the maintenance port is located on the upper cover.

* * * * *